United States Patent
Lavie et al.

(10) Patent No.: US 7,542,998 B1
(45) Date of Patent: Jun. 2, 2009

(54) CAUSE TO EFFECT METHODOLOGY FOR MONITORING DATABASE PERFORMANCE

(75) Inventors: Gavriela D. Lavie, Tel Aviv (IL); Shiri Kerman-Hendell, Tel-Aviv (IL)

(73) Assignee: Precise Software Solutions Ltd., Or-Yehuda (IL)

( * ) Notice: Subject to any disclaimer, the term of this patent is extended or adjusted under 35 U.S.C. 154(b) by 362 days.

(21) Appl. No.: 10/736,999

(22) Filed: Dec. 16, 2003

(51) Int. Cl.
    *G06F 17/30* (2006.01)
(52) U.S. Cl. ........................ 707/200; 707/102
(58) Field of Classification Search ......... 707/200–204, 707/104.1, 102
    See application file for complete search history.

(56) References Cited

U.S. PATENT DOCUMENTS

| | | | | |
|---|---|---|---|---|
| 5,664,093 | A | 9/1997 | Barnett et al. ................. | 714/31 |
| 5,907,844 | A * | 5/1999 | Guay et al. ................... | 707/100 |
| 6,012,152 | A | 1/2000 | Douik et al. .................. | 714/26 |
| 6,223,171 | B1 * | 4/2001 | Chaudhuri et al. ............ | 707/2 |
| 6,249,755 | B1 | 6/2001 | Yemini et al. ................ | 702/183 |
| 6,338,149 | B1 | 1/2002 | Ciccone, Jr. et al. .......... | 714/38 |
| 6,345,267 | B1 | 2/2002 | Lohman et al. ................ | 707/2 |
| 6,714,893 | B2 | 3/2004 | Busche et al. ................. | 702/181 |
| 6,782,345 | B1 * | 8/2004 | Siegel et al. ................. | 702/183 |
| 6,801,903 | B2 | 10/2004 | Brown et al. .................. | 707/2 |
| 6,807,583 | B2 | 10/2004 | Hrischuk et al. ............. | 719/318 |
| 6,836,800 | B1 | 12/2004 | Sweet et al. ................. | 709/224 |
| 6,856,942 | B2 | 2/2005 | Garnett et al. ............... | 702/183 |
| 6,868,367 | B2 * | 3/2005 | Yemini et al. ................ | 702/183 |
| 6,885,641 | B1 * | 4/2005 | Chan et al. ................... | 370/252 |
| 7,295,960 | B2 * | 11/2007 | Rappaport et al. ............ | 703/13 |
| 2001/0032199 | A1 * | 10/2001 | Delo ............................. | 707/3 |
| 2002/0173997 | A1 * | 11/2002 | Menard et al. ................ | 705/7 |
| 2002/0184065 | A1 * | 12/2002 | Menard et al. ................ | 705/7 |
| 2003/0065986 | A1 * | 4/2003 | Fraenkel et al. ............... | 714/47 |
| 2003/0110007 | A1 * | 6/2003 | McGee et al. ................. | 702/179 |
| 2004/0133395 | A1 * | 7/2004 | Ding et al. .................... | 702/182 |
| 2005/0097149 | A1 * | 5/2005 | Vaitzblit et al. ............. | 707/202 |

* cited by examiner

*Primary Examiner*—Cheryl Lewis
(74) *Attorney, Agent, or Firm*—Meyertons Hood Kivlin Kowert & Goetzel, P.C.; B. Noël Kivlin

(57) ABSTRACT

A system and method for monitoring database performance. In one embodiment, a method may comprise detecting a change to a database. In response to detecting the change, the method may predict a set of outcomes resulting from the change, monitor the database to determine whether any outcome of the set of outcomes has occurred, and report that one or more of the predicted outcomes has occurred. In one embodiment, the set of outcomes may be predicted based on a set of predictive rules. Determining whether any outcome of the set of outcomes has occurred may comprise comparing the performance of the database after the change to a historical baseline. Furthermore, reporting on the set of outcomes may include making recommendations on alternate changes to the database and summarizing the historical baseline. In one embodiment the set of predictive rules may be derived from multiple databases on the recorded effects of various changes.

20 Claims, 4 Drawing Sheets

CAUSE TO EFFECT METHODOLOGY FOR MONITORING DATABASE PERFORMANCE

BACKGROUND OF THE INVENTION

1. Field of the Invention

This invention relates to the field of computer processing and, more particularly, to the display of computer system performance information.

2. Description of the Related Art

In the information technology (IT) departments of modern organizations, one of the biggest challenges is meeting the increasingly demanding service levels required by users. With more and more applications directly accessible to customers via automated interfaces such as the world wide web, "normal" business hours for many enterprises are now 24 hours a day, 7 days a week. The need for continuous availability and performance of applications has created complex, tiered IT infrastructures which often include web servers, middleware, networking, database, and storage components. These components may be from different vendors and may reside on different computing platforms. A problem with any of these components can impact the performance of applications throughout the enterprise.

The performance of key applications is a function of how well the infrastructure components work in concert with each other to deliver services. With the growing complexity of heterogeneous IT environments, however, the source of performance problems is often unclear. Consequently, application performance problems can be difficult to detect and correct. Furthermore, tracking application performance manually can be an expensive and labor-intensive task. Therefore, it is usually desirable that application performance management tasks be automated.

Automated tools for application performance management may assist in providing a consistently high level of performance and availability. These automated tools may result in lower costs per transaction while maximizing and leveraging the resources that have already been spent on the application delivery infrastructure. Automated tools for application performance management may give finer control of applications to IT departments. Application performance management tools may enable IT departments to be proactive and fix application performance issues before the issues affect users. Historical performance data collected by these tools can be used for reports, trending analyses, and capacity planning. By correlating this collected information across application tiers, application performance management tools may provide actionable advice to help IT departments solve current and potential problems.

In a real-world environment, the performance of applications may be highly variable due to normal variations in resource usage over time. Furthermore, requirements such as user needs, usage patterns, customization requirements, system components, architectures, and platform environments may vary from business unit to business unit. These variations may also cause application performance to be highly variable. Tuning applications to work together efficiently and effectively in their unique environments can be crucial to reaching organizational goals and maintaining competitive advantages. Automated tools for application performance management can assist in these tuning operations.

SUMMARY OF THE INVENTION

Various embodiments of a system and method for monitoring database performance are disclosed. In one embodiment, a method may comprise detecting a change to a database. In response to detecting the change, the method may predict a set of outcomes resulting from the change, monitor the database to determine whether any outcome of the set of outcomes has occurred, and report that one or more of the predicted outcomes has occurred. In one embodiment, the set of outcomes may be predicted based on a set of predictive rules. Determining whether any outcome of the set of outcomes has occurred may comprise comparing the performance of the database after the change to a historical baseline. Furthermore, reporting on the set of outcomes may include making recommendations on alternate changes to the database and summarizing the historical baseline. In one embodiment the set of predictive rules may be derived from multiple databases on the recorded effects of various changes.

Figure 1:
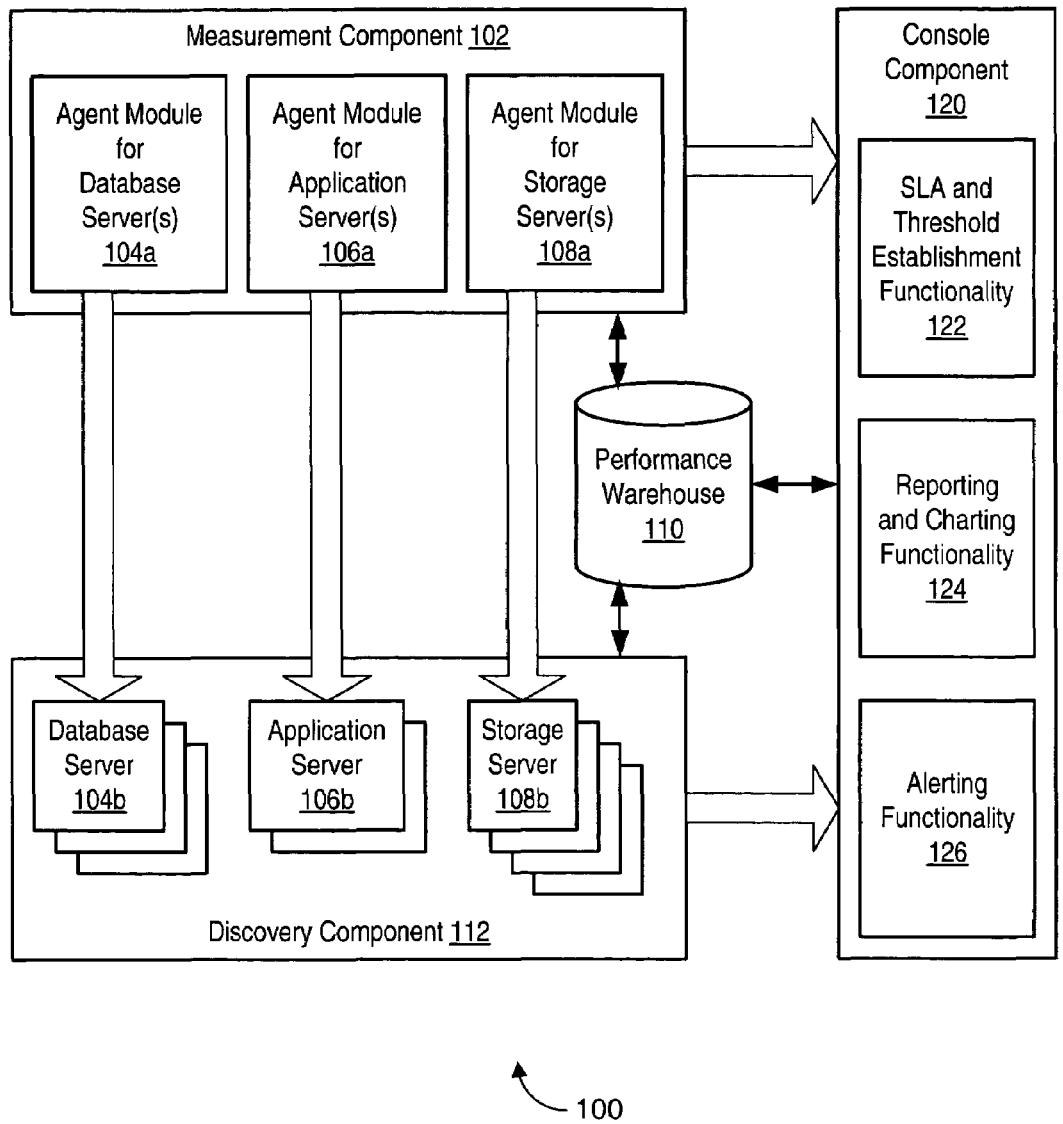
FIG. 1 is a block diagram of one embodiment of a performance management system.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION

A performance management system may include one or more software programs for application performance management. By continuously monitoring key components and/or applications of computer systems, the performance management system may act to detect and report performance problems among applications and other system components in a complex computing environment. The performance management system may provide performance management in a variety of stages, such as: identification of symptoms that could indicate a performance problem, identification of sources or locations of problems, discovery of root causes of problems, recommendation of measures to address the root causes and improve performance, and verification that the measures have achieved desired goals. By defining baselines for "normal" application behavior, the performance management system may automatically detect degradation based on those established norms.

In one embodiment, the performance management system may be implemented in a variety of versions, each of which is customized for management of a particular class of target software: e.g., various products from PeopleSoft, Inc.; Oracle® database management software and related applications; web-based applications; SAP®; various products from Siebel Systems, Inc.; ClarifyCRM™; J2EE™; and other suitable targets. Furthermore, each of the versions may be implemented on one or more computing platforms (e.g., Solaris running on Sun Microsystems™ hardware, or a Microsoft Windows® OS running on Intel-based hardware). As used herein, the term "performance management system" is intended to include all of these disparate, customized software programs.

Figure 2:
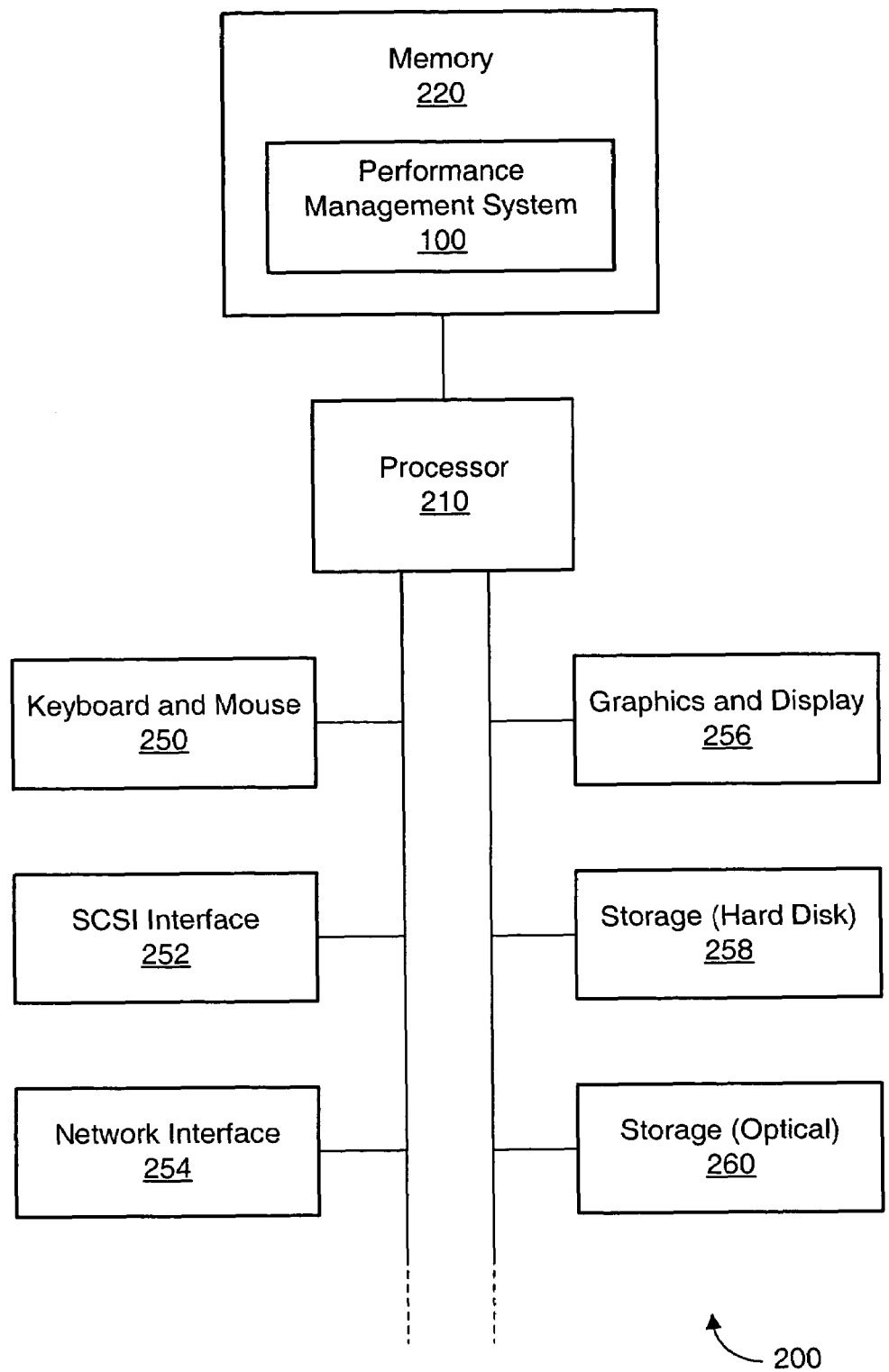
FIG. 2 is a block diagram of one embodiment of a computer system.

FIG. 1 is an architecture diagram of a performance management system 100 in an exemplary configuration. As illustrated in FIG. 1, the performance management system 100 may include components such as a measurement component 102 (including various agent modules 104a, 106a, and 108a), a discovery component 112, a console component 120, and a performance warehouse 110. The various components of the performance management system 100 may reside on the same computer system, on different computer systems, or on an arbitrary combination of computer systems. An exemplary computer system is illustrated in FIG. 2.

In one embodiment, the measurement component 102 uses agent software to capture performance metrics on servers running target applications. The measurement component 102 may provide a "breadth-wise" view of performance across multiple technology tiers (e.g., web clients, web servers, networks, application servers, database servers, storage servers, etc.). The measurement component 102 may measure, for example, end-to-end response times from the viewpoint of a user. The measurement component 102 may measure segmented response times from tier to tier and may therefore indicate the location of performance problems in a particular tier.

In one embodiment, a "base" version of the measurement component 102 may provide monitoring of a limited set of targets (e.g., TCP/IP-based applications). The functionality of the measurement component 102 may be augmented with optional agent modules that are customized to gather and analyze data for particular targets (e.g., web clients, web servers, networks, application servers, database servers, storage servers, etc.). For purposes of illustration and example, three agent modules 104a, 106a, and 108a are shown. Other combinations of agent modules may be used in other configurations.

In one embodiment, the discovery component 112 provides identification of root causes of performance degradation. By permitting a user to "drill down" through various tiers of hardware and software (e.g., individual servers), the discovery component 112 may provide a "depth-wise" view of performance within each of the tiers that a target application crosses. The discovery component 112 may further indicate steps to be taken to fix current problems or avoid future problems.

In FIG. 1, each of the server blocks 104b, 106b, and 108b within the discovery component 112 are intended to represent installations of agent software on the respective servers. For example, the three database server blocks 104b represent three agent software modules associated with three respective database server installations. Likewise, the two application server blocks 106b represent two agent software modules associated with three respective application server installations, and the four storage server blocks 108b represent four agent software modules associated with four respective storage server installations. The combination of servers 104b, 106b, and 108b is provided for purposes of illustration and example and is not intended to be limiting.

In one embodiment, the console component 120 includes a "watchdog" layer that communicates key performance indicators, such as exceptions to service level agreements (SLAs), to appropriate users at appropriate times. The console component 120 may include functionality 122 for establishing SLAs and other thresholds. The console component 120 may include functionality 124 for reporting and charting. The console component 120 may include functionality 126 for providing alerts. Therefore, the console component 120 may function as a management console for user interaction with the measurement component 102 and discovery component 112.

In one embodiment, the performance warehouse 110 includes a repository of performance metrics which are accessible to the other components in the performance management system 100. For example, the historical data in the performance warehouse 110 may be used by the other components to provide short- and long-term analysis in varying degrees of detail. In one embodiment measurement component 102 and discovery component 112 may store output data in performance warehouse 110, which may later be used to construct additional performance metrics.

The performance management system 100 of FIG. 1 may be executed by one or more networked computer systems. FIG. 2 is an exemplary block diagram of such a computer system 200. The computer system 200 includes a processor 210 and a memory 220 coupled together by a communications bus. The processor 210 can be a single processor or a number of individual processors working together. The memory 220 is typically random access memory (RAM), or some other dynamic storage device, and is capable of storing instructions to be executed by the processor 210. The memory 220 may store temporary variables or other intermediate information during the execution of instructions by the processor 210. The memory 220 may store operating system (OS) software to be executed by the processor 210.

In various configurations, the computer system 200 may include devices and components such as a keyboard & mouse 250, a SCSI interface 252, a network interface 254, a graphics & display device 256, a hard disk 258, and/or a CD-ROM 260, all of which are coupled to the processor 210 by the communications bus. The network interface 254 may provide a communications link to one or more other computer systems via a LAN (local area network), WAN (wide area network), internet, intranet, or other appropriate networks. It will be apparent to those having ordinary skill in the art that the computer system 200 can also include numerous elements not shown in the figure, such as additional storage devices, communications devices, input devices, and output devices, as illustrated by the ellipsis.

Figure 3:
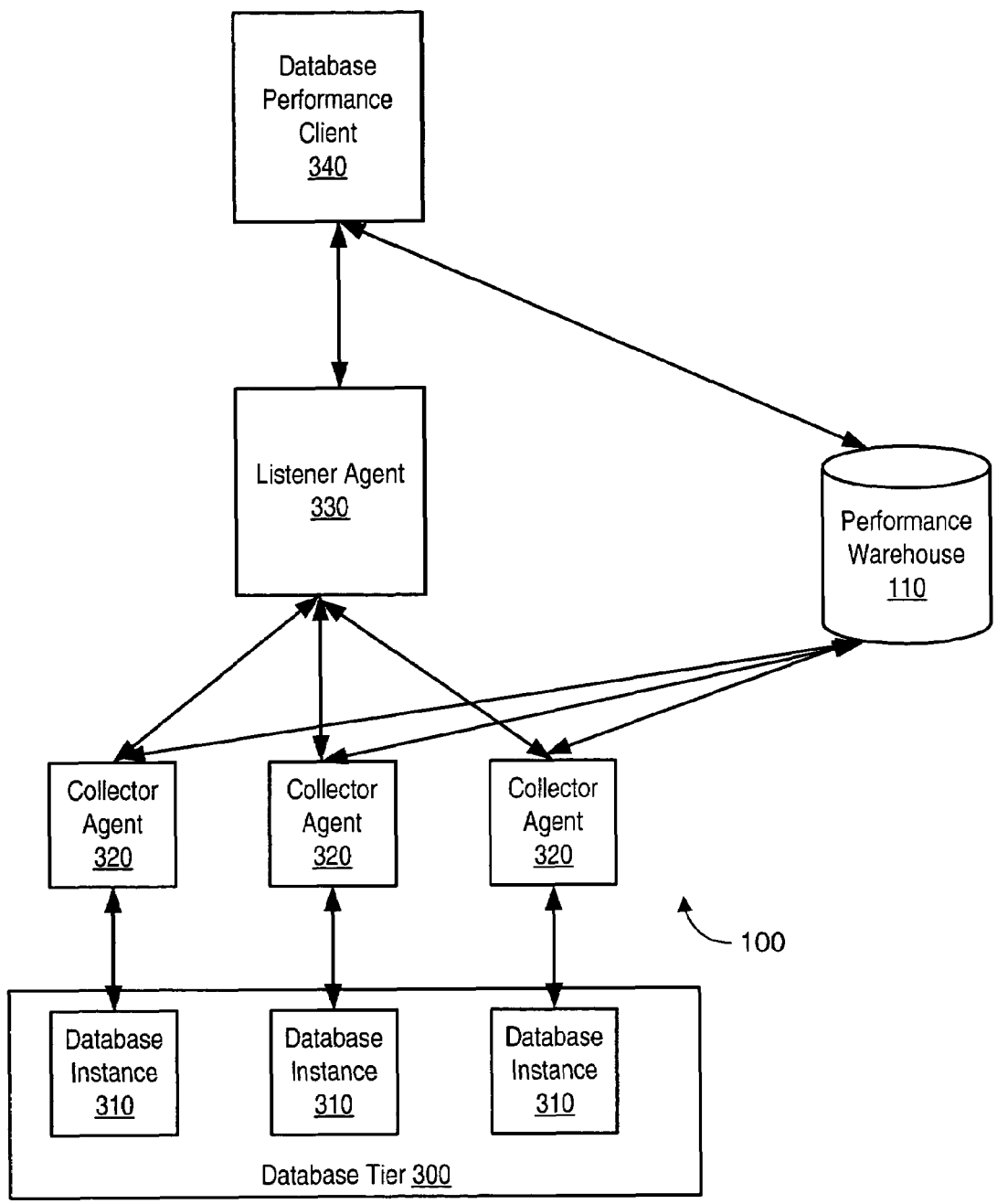
FIG. 3 is a block diagram of one embodiment of a database performance monitor system.

Turning now to FIG. 3, a block diagram illustrating one embodiment of a system for monitoring outcomes resulting from a change to a database is shown. In one embodiment, a database tier 300 may comprise a plurality of database instances 310, each operable to store, retrieve, modify, and delete data from one or more tables or other data schema. Database tier 300 may comprise systems and/or components from Oracle, IBM, BP, Hitachi, or any other type of database system, in any type of configuration.

Each database instance 310 may be associated with a collector agent 320. In one embodiment, each collector agent 320 may be operable to monitor and record all transactions and other activities carried out by the associated database instance 310. Specifically, each collector agent 320 may be operable to record information including, but not limited to, the number and type of transactions carried out by each database, timing information on each transaction, and information regarding changes to user settings and schema definitions within the database. It is further noted that in one embodiment, each collector agent 320 may be operable to utilize a sampling technique to minimize the utilization of resources.

In one embodiment, each collector agent 320 may be operable to communicate with performance warehouse 110. As described above, performance warehouse 110 may be operable to maintain a collection of historical data on the performance of one or more application tiers such as database tier 300. In addition, performance warehouse 110 may be operable to analyze this data to determine a "normal" performance profile for each application tier. Accordingly, performance warehouse 110 may be able to store the information recorded by collector agents 320 to determine a historical baseline performance for database tier 300, as will be described in further detail below.

Each collector agent 320 may be further operable to communicate with a database listener agent 330. In various embodiments collector agents 320 may be operable to notify database listener 330 of a detected change to the database tier, or may be operable to send recorded information to database listener 330 based on an information request from database listener 330.

Database listener agent 330 is operable to acquire data from each server instance 310 in database tier 300 in response to client requests. For example, in one embodiment, database listener agent 330 may be operable to retrieve the recorded information on the performance and activities of database tier 300 from collector agents 320 in response to requests from a database performance client 340. Database listener 330 may then be able to relay the collected information from each collector agent to database performance client 340. In one embodiment, database listener 330 may further be operable to forward information on a change to the database tier detected by a collector agent 320, as described above.

Database performance client 340 may be operable to retrieve information on the performance and activities of database tier 300 through listener agent 330. In addition, database performance client 340 may be operable to retrieve information on the performance of database tier 300 from performance warehouse 110. As will be described in further detail below, in one embodiment performance client 340 may additionally be operable to analyze changes to database tier 300, determine the possible and actual outcomes resulting from each change based on a set of predictive rules, and make a report to an end user.

It is noted that many of the details of FIG. 3 are purely exemplary, and that other configurations are possible. For example, database tier 300 may comprise any number of database instances 310, each with an associated collector agent 320. In addition, in one embodiment performance warehouse 110 may be omitted, and all performance data recording and analysis tasks may be handled by listener agent 330 and database performance client 340.

It is further noted that in various embodiments the functionality illustrated in FIG. 3 may be carried out by components of the performance management system 100 illustrated in FIG. 1. For example, the functionality of each collector agent 320 in FIG. 3 may be embodied within the respective database server blocks 104b of FIG. 1. Likewise, the functionality of listener agent 330 may be embodied within the database server agent module 104a of FIG. 1, and the functionality of database performance client 340 may be embodied within console component 120. However, it is also noted that in various other embodiments the components illustrated in FIG. 3 may be separate components within performance management system 100, or may be entirely separate from performance management system 100.

Figure 4:
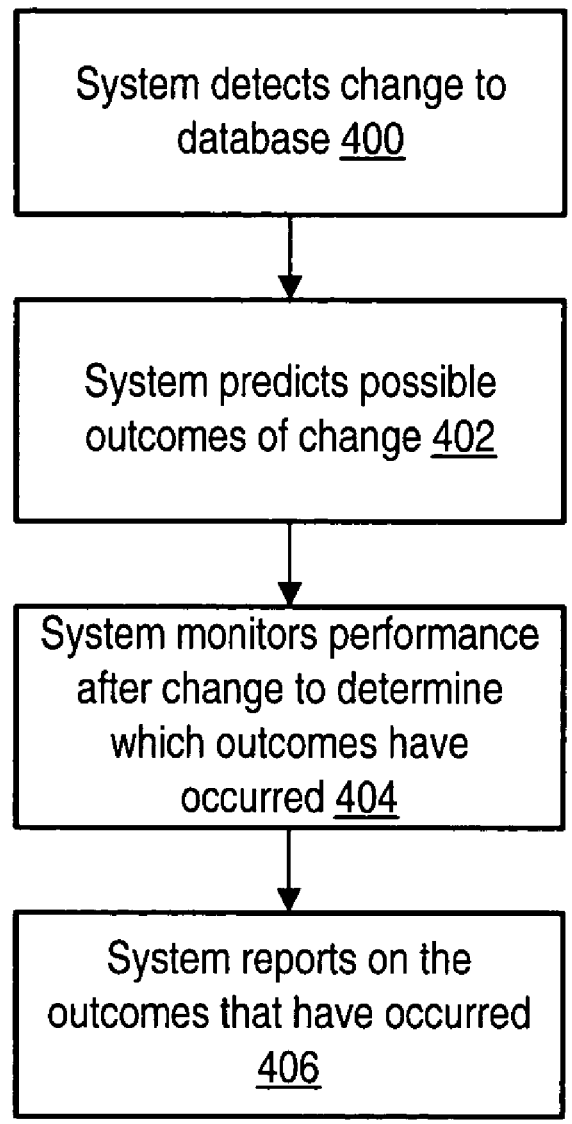
FIG. 4 is a flowchart illustrating one embodiment of a method for tracking changes to a database.

FIG. 4 is a flowchart illustrating one embodiment of a method for tracking outcomes from a change to a database. Referring collectively now to FIGS. 1-4, in step 400, performance management system 100 may detect a change to database tier 300. In one embodiment, a change to a database may comprise deleting of a database index, decreasing the size of a sort area, or other modification to database settings or data schema.

In step 402, the performance management system predicts a set of outcomes that may arise from the change detected in step 400. In one embodiment, the system may have access to a set of predictive rules which list possible outcomes resulting from each detectable change to the database. In one embodiment, the rules may be programmed in to the system, based on historical study of changes to databases similar to database tier 300. In other embodiments, the rules may be created or updated based on the behavior of database tier 300 as observed by the performance management system.

In step 404, the system monitors the performance of the database to determine if the outcomes predicted in 402 have occurred. In one embodiment, the system may compare the current performance of the database to the performance of the database before the change. For example, in step 400 performance management system 100 may have detected a user deleting an index to a table in the database tier. In step 402, the system may accordingly predict that all database queries which utilized the deleted index and/or its base table may suffer a drop in performance. Then, in step 404, the system may track the performance of the predicted queries to determine if their performance has decreased relative to performance prior to the change in the database.

In step 406, the system reports to the end user which of the predicted outcomes have occurred, based on the database monitoring of step 404. In one embodiment the system may report only those outcomes which have occurred based on monitored performance, while in another embodiment the system may report each possible (predicted) outcome and indicate which outcomes have actually occurred. It is noted that in some embodiments the method of FIG. 4 may return to step 404 after executing step 406, thereby allowing the performance management system to continue monitoring possible effects of the change to the database.

It is also noted that in one embodiment, the system may make recommendations as to alternate changes that could be made to the database to increase performance. For example, the system may provide a user indication which suggests modifying one or more queries or one or more indexes to minimize the performance impact of an index deletion. It is further noted that in some embodiments, the system may provide an overview of the performance data which demonstrates that performance has decreased based on the detected change. In various embodiments this data may include the historical baseline and performance data from after the change to data database tier.

In a further embodiment, the system may also indicate a degree of "confidence" in concluding that a change has decreased performance. For example, in one instance the performance of a database query may decrease drastically immediately after a single schema change to the database, in which case the system may report a high degree of confidence that the schema change has effected performance. Alternatively, in another instance the performance of a database query may decrease only slightly, and a plurality of changes to the database may have been made at approximately the same time. In such an instance, the system may report that a specific change cannot be connected to the performance decrease with any great degree of certainty. In a further embodiment, the degree of certainty may be combined with the magnitude of the resulting change to produce a degree of severity indicator. For instance, one change directly responsible for a large performance drop might be reported as having a high degree of severity, while another change with a less direct causal link to a large performance drop might have a low or moderate degree of severity.

In one embodiment, certain aspects of step 406 may be carried out after step 400. For example, in one embodiment the performance management system may report to the end user on the possible outcomes resulting from a change immediately after the user has made the change. The system may thereby prevent certain specific changes from causing a severe drop in performance.

It is further noted that, in various embodiments, performance management system 100 may be operable to carry out the steps described in FIG. 4 many times over in parallel, so that multiple independent changes to the database may be detected and monitored on an independent basis.

It is additionally noted that a system and method similar to that described above may be employed to detect changes and predict outcomes in computing environments other than database specific environments. For example, in one embodiment performance management system 100 may be configured to detect changes, predict possible outcomes, and report on performance of an application server tier. In other embodiments, web server tiers, file server clusters or networks may be analyzed.

It is further noted that any of the embodiments described above may further include receiving, sending or storing instructions and/or data that implement the operations described above in conjunction with FIGS. 1-4 upon a computer readable medium. Generally speaking, a computer readable medium may include storage media or memory media such as magnetic or optical media, e.g. disk or CD-ROM, volatile or non-volatile media such as RAM (e.g. SDRAM, DDR SDRAM, RDRAM, SRAM, etc.), ROM, etc. as well as transmission media or signals such as electrical, electromagnetic, or digital signals conveyed via a communication medium such as network and/or a wireless link.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method comprising:
   detecting a change to a setting of a database system;
   determining a plurality of predicted outcomes resulting from the detected change, wherein the plurality of predicted outcomes relate to future operation of the database system;
   monitoring the database system for an occurrence of at least one of the predicted outcomes;
   based on the monitoring, detecting the occurrence of at least one of the predicted outcomes; and
   displaying to a user an indication of the occurrence of the at least one of the predicted outcomes.

2. The method of claim 1, further comprising:
   generating a determination that the change to the setting of the database system has decreased performance of the database system;
   determining a degree of confidence in the determination that the setting of the change to the database system has decreased performance of the database system; and
   displaying to the user the degree of confidence in the determination that the setting of the change to the database system has decreased performance of the database system.

3. The method of claim 1 wherein the plurality of predicted outcomes is determined based on a set of predictive rules.

4. The method of claim 1 wherein the plurality of predicted outcomes is determined based on monitored historical behavior of the database system.

5. The method of claim 1 wherein monitoring the database system includes monitoring the number and type of transactions carried out by the database system.

6. The method of claim 1 wherein monitoring the database system includes monitoring timing information associated with database transactions.

7. The method of claim 1 wherein monitoring the database system includes comparing a performance of the database system after the change to a historical baseline.

8. The method of claim 1 further comprising providing a user indication that indicates recommendations of alternate changes to the database system.

9. A system comprising:
   a processor; and
   a memory storing program instructions executable by the processor to:
      detect a change to a setting of a database system;
      determine a plurality of predicted outcomes resulting from the detected change, wherein the plurality of predicted outcomes relate to future operation of the database system;
      monitor the database system for an occurrence of at least one of the predicted outcomes;
      based on the monitoring, detect the occurrence of at least one of the predicted outcomes; and
      cause a user indication of the occurrence of the at least one of the predicted outcomes to be displayed.

10. The system of claim 9, further comprising program instructions executable by the processor to:
    generate a determination that the change to the setting of the database system has decreased performance of the database system;
    determine a degree of confidence in the determination that the change to the setting of the database system has decreased performance of the database system; and
    display to the user the degree of confidence in the determination that the change to the setting of the database system has decreased performance of the database system.

11. The system of claim 9 wherein the program instructions are further executable by the processor to determine the plurality of predicted outcomes based on a set of predictive rules.

12. The system of claim 9 wherein the program instructions are further executable by the processor to determine the plurality of predicted outcomes based on monitored historical behavior of the database system.

13. The system of claim 9 wherein the program instructions are further executable by the processor to monitor the database system by comparing a performance of the database system after the change to a historical baseline.

14. The system of claim 9 wherein the program instructions are further executable by the processor to provide a user indication that indicates recommendations of alternate changes to the database system.

15. A computer readable storage medium including program instructions executable to:
    detect a change to a setting of a database system;
    determine a plurality of predicted outcomes resulting from the detected change, wherein the plurality of predicted outcomes relate to future operation of the database system;
    monitor the database system for an occurrence of at least one of the predicted outcomes;

based on the monitoring, detect the occurrence of at least one of the predicted outcomes; and cause a user indication of the at least one of the predicted outcomes to be displayed.

16. The storage medium of claim 15, further comprising program instructions executable by the processor to:

generate a determination that the change to the setting of the database system has decreased performance of the database system;

determine a degree of confidence in the determination that the change to the setting of the database system has decreased performance of the database system; and display to the user the degree of confidence in the determination that the change the setting of to the database system has decreased performance of the database system.

17. The storage medium of claim 15 wherein the program instructions are further executable by the processor to determine the plurality of predicted outcomes based on a set of predictive rules.

18. The storage medium of claim 15 wherein the program instructions are further executable by the processor to determine the plurality of predicted outcomes based on monitored historical behavior of the database system.

19. The storage medium of claim 15 wherein the program instructions are further executable by the processor to provide a user indication that indicates recommendations of alternate changes to the database system.

20. A system comprising:

means for detecting a change to a setting of database system;

means for determining a plurality of predicted outcomes resulting from the detected change, wherein the plurality of predicted outcomes relate to future operation of the database system;

means for monitoring the database system for an occurrence of at least one of the predicted outcomes;

means for detecting the occurrence of at least one of the predicted outcomes based on the monitoring; and means for displaying to a user an indication of the occurrence of the at least one of the predicted outcomes based on the detecting.

\* \* \* \* \*